(12) United States Patent
De Mul

(10) Patent No.: US 8,033,737 B2
(45) Date of Patent: Oct. 11, 2011

(54) ROLLING BEARING WITH IMPROVED RIM GEOMETRY

(75) Inventor: Jan De Mul, Aurachtal (DE)

(73) Assignee: Schaeffler KG, Herzogenaurach (DE)

( * ) Notice: Subject to any disclaimer, the term of this patent is extended or adjusted under 35 U.S.C. 154(b) by 636 days.

(21) Appl. No.: 12/158,363

(22) PCT Filed: Dec. 8, 2006

(86) PCT No.: PCT/DE2006/002185
§ 371 (c)(1),
(2), (4) Date: Jul. 22, 2008

(87) PCT Pub. No.: WO2007/071229
PCT Pub. Date: Jun. 28, 2007

(65) Prior Publication Data
US 2008/0310788 A1 Dec. 18, 2008

(30) Foreign Application Priority Data
Dec. 21, 2005 (DE) .......................... 10 2005 061 103

(51) Int. Cl.
*F16C 33/58* (2006.01)
*F16C 19/00* (2006.01)
(52) U.S. Cl. .................. 384/564; 384/450; 384/619

(58) Field of Classification Search ................ 384/450, 384/462, 558, 568, 571, 619, 564–567
See application file for complete search history.

(56) References Cited

U.S. PATENT DOCUMENTS

| | | | | |
|---|---|---|---|---|
| 3,547,504 A * | 12/1970 | Lech et al. | .................... | 384/558 |
| 4,027,930 A * | 6/1977 | Bodensieck | .................. | 384/556 |
| 4,318,574 A | 3/1982 | Nakamura | | |
| 5,234,272 A * | 8/1993 | Shimada | ....................... | 384/564 |
| 6,502,996 B2 * | 1/2003 | Joki | ............................ | 384/568 |
| 6,530,693 B1 | 3/2003 | Ijuin et al. | | |
| 6,767,134 B2 * | 7/2004 | Murai et al. | .................. | 384/565 |
| 7,048,445 B2 * | 5/2006 | Torisawa | ...................... | 384/450 |
| 7,150,565 B1 * | 12/2006 | Koyama et al. | ............... | 384/548 |
| 7,416,346 B2 * | 8/2008 | Takemura et al. | ............. | 384/564 |
| 2001/0012420 A1 * | 8/2001 | Unno et al. | ................... | 384/571 |
| 2003/0091255 A1 | 5/2003 | Sakoda et al. | | |

FOREIGN PATENT DOCUMENTS
DE    10 2004 016284    10/2005
* cited by examiner

Primary Examiner — Marcus Charles
(74) Attorney, Agent, or Firm — Lucas & Mercanti, LLP

(57) ABSTRACT

A rolling bearing which has at least one bearing ring and a plurality of rollers. The bearing ring has a raceway for the rollers and at least one lateral rim for axially guiding the rollers. The roller has front face facing the rim and the rim has a rim bearing surface facing the roller. At least sections of at least the front face or the rim bearing surface have a toroidal camber in the direction of the rim bearing surface or the front face.

10 Claims, 1 Drawing Sheet

ROLLING BEARING WITH IMPROVED RIM GEOMETRY

FIELD OF THE INVENTION

The invention relates to a rolling bearing. The present invention is described with reference to tapered roller bearings, although it is pointed out that the invention may also be applied to other types of bearing, such as cylindrical roller bearings or self-aligning ball bearings.

BACKGROUND OF THE INVENTION

According to the state of the art, roller bearings are known which, with reference to a raceway, have lateral rims for absorbing axial stress components. In this connection, according to the state of the art, cylindrical roller bearings with flat roller front faces and flat rim faces are known. These bearings give rise to edge loading of the rolling body with respect to the rim. The result of such edge loading is a reduced working life of the rolling bearing.

In addition, according to the state of the art, cylindrical roller bearings are known where the front face of the rolling bodies is formed in the manner of a spherical cap. In the case of these rolling bodies a central region of the front faces is not spherical, but is formed flat or with a depression. Thus the contact surface of these rolling bodies is at least on the rim shoulder to a certain degree truncated, resulting in a limited axial load capacity during rim contact.

The object of the present invention is therefore to provide a rolling bearing which is able to withstand higher axial stresses compared to the state of the art. A special area of application of such tapered or cylindrical roller bearings is for example wind power gearing.

This object is achieved according to the invention by a rolling bearing according to claim 1.

Advantageous embodiments and further constructional forms are the subject of the dependent claims.

SUMMARY OF THE INVENTION

The rolling bearing according to the invention has at least one bearing ring and a plurality of rolling bodies, the bearing ring having a raceway for the rolling bodies and at least one lateral rim for axially guiding the rolling bodies. According to the invention the rolling body has a front face facing the rim and the rim has a rim bearing surface facing the rolling body. In this connection at least the front face or the rim bearing surface is, at least along sections, curved in a convex manner toroidally in the direction of the rim bearing surface or the front face.

The bearing ring may concern a bearing outer ring or a bearing inner ring. The front face of the rolling body is understood as being the end face thereof as opposed to the lateral surface, the rolling body rolling with its lateral surface along the raceway of the bearing ring.

Preferably the rolling bearing has a second bearing ring and the rolling bodies are arranged between the first and the second bearing rings. A lateral rim is preferably also arranged on the second bearing ring and especially preferably on the side of the rolling bearing lying opposite the first rim.

Whereas, in the spherical cap like curvature known according to the state of the art the entire front face of the rolling body has, along sections, the form of a sphere, the radius of this sphere lying on the axis of rotation of the rolling body, according to the invention the toroidal curvature of the front face is not described by a sphere, the center of which lies on the axis of rotation of the rolling body, but for example by circular lines or ellipse lines, the centers of which are offset from the axis of rotation. More precisely, in a preferred embodiment, the centers of the toroidal curvatures are arranged in the manner of a circle around the axis of rotation of the rolling body.

In this connection these centers need not necessarily be the centers of circles, but they may also be centers of ellipses or similarly formed bodies. As a result of the toroidal curvature according to the invention, a circular curvature is achieved in the outer region of the rolling body. Thus, viewing the rolling body in axial section, a flat central region adjoins an outer region with a given radius of curvature and a second curved region with the given radius of curvature adjoins this flat central region.

This situation is described in more detail with reference to the figures.

Preferably the aperture angle between the raceway and the rim bearing surface is greater than 90°. In the case of evenly curved surfaces, in order to determine the rim aperture angle, a straight line is considered, said line running in the radial direction of the rolling bearing through the starting point and the end point of the curvature. As a result of this embodiment, instead of a contact area between the front face of the rolling bearing and the rim bearing surface, there is a contact point with a gap gradually opening outwards. In this way a frictionally favorable contact is established, resulting in favorable penetration of lubricant and thus a smaller amount of friction.

In addition, as a result of the inventive constructional form of the rim bearing surface and the front face of the rolling body, an effectively round geometry is obtained in the region of contact and thus a high tolerance with respect to tilting or skewing of the roller is achieved.

In a further preferred embodiment both the front face and the rim bearing surface are curved at least along sections. Particularly preferably both the rim bearing surface and the front face of the rolling body have a crowned form with a given toroidal radius. In this connection this toroidal radius of the two curvatures may be the same, although the two radii may also vary with respect to each other.

Preferably both the front face and the rim bearing surface are curved in a convex manner in the direction of the respective other surface or face. In this way particularly favorable penetration of lubricant may be achieved. It is also possible, however, for one of the two surfaces to be curved in a concave manner, in which case the corresponding convex radius of curvature is particularly preferably smaller than the concave radius of curvature.

Preferably the front face of the rolling body lies at least at a distance on a circular line. This means that, as mentioned above, the curvatures of the rolling body, in axial section, are formed by circular lines, the centers of these circular lines being situated offset at a given distance from the axis of rotation of the rolling body preferably in the direction of the curvature.

Preferably at least one component of the rolling bearing according to the invention is produced by means of a hard turning process. By using the hard turning process it is possible to achieve low-cost production of the torus radii mentioned.

Preferably the rolling bearing is chosen from a group of rolling bearings which includes cylindrical roller bearings, tapered roller bearings, self-aligning ball bearings, radial bearings, axial bearings and the like.

In a further preferred embodiment the radius of curvature at least of the rim bearing surface or the front face, according to the amount, is at least three times as great as the diameter of the rolling body. Through this selection of the radius of curvature it is possible to achieve a particularly efficient contact between the front face and the rim bearing surface. The radius of curvature of one of the two surfaces may, however, also be infinite, i.e. in this case the curvature may be represented by a straight line.

Stated more precisely, if the toroidal radius in the case of one of the two surfaces is infinite, in axial section a straight line is obtained instead of a spherical formation. This straight line is again the generatrix of a cone of the rim bearing surface or the front face of the rolling body, depending on whether the straight line is turned about the axis of symmetry of the rolling body or about the axis of symmetry of the rolling bearing in its entirety.

It is however also possible to envisage a plane instead of a conical surface if the rim bearing surface is perpendicular to the bearing axis.

In a preferred embodiment the curvatures of the rim bearing surface and the front face are formed such that substantially only one contact point occurs between the rim bearing surface and the front face. In this connection particularly preferably, this contact point is situated in the radial direction of the rolling body at least at the same distance from the axis of symmetry of the rolling body as the center of the circular line which describes the curvature of the front face.

In general this means that preferably the center of the circular lines for different rolling bodies according to the invention are arranged on a torus center line which extends parallel with respect to the axis of symmetry of the rolling body. With respect to this torus center line the contact point lies, in the radial direction of the rolling body, outside thereof. This means that the touching or contact line is inclined at a given angle with respect to the torus center line. This angle of inclination lies between 0° and 30° and preferably between 0° and 10°.

BRIEF DESCRIPTION OF THE DRAWINGS

Further advantages and embodiments will become clear from the accompanying drawings.

In these drawings.

DETAILED DESCRIPTION OF THE INVENTION

Figure 1:
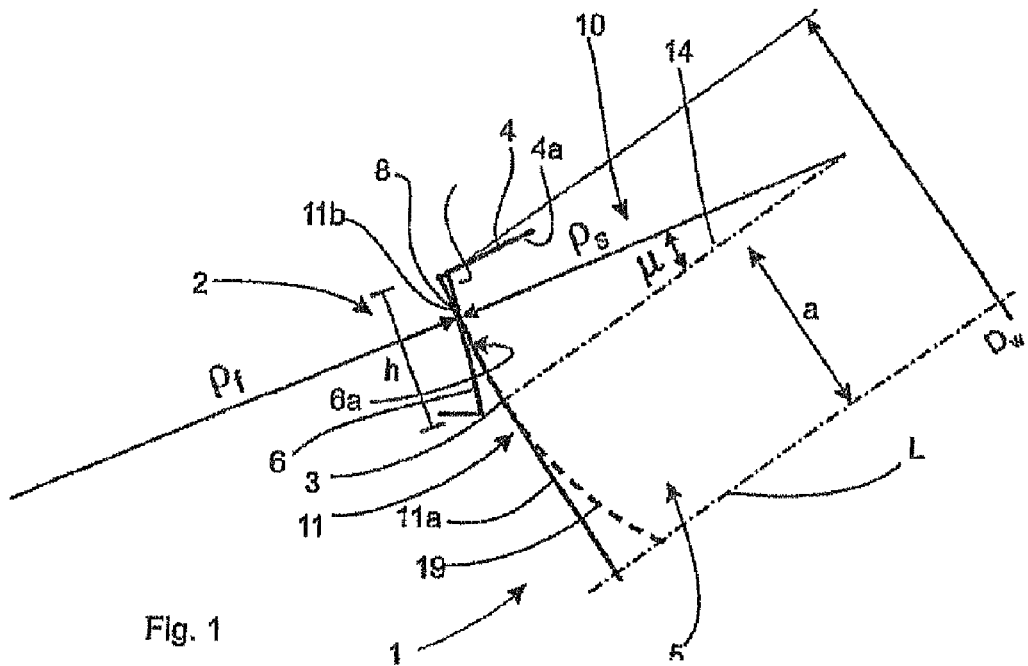
FIG. 1 is a partial view illustrating the basic geometrical layout of the rolling bearing.

FIG. 1 shows a schematic sectional representation of a rolling bearing 1 according to the invention, illustrating the geometrical layout thereof. In this connection the reference number 5 refers to a rolling body for a tapered roller bearing, although only a part of the front face 11 of this rolling body is shown.

This front face 11 of the rolling body 5 has a central section 11a as well as an edge region 11b. In this embodiment the central section 11a extends substantially in the form of a straight line and the edge region 11b is curved. The reference number 6 refers to a lateral rim of a bearing ring 2 which has a rim bearing surface 6a which faces the front face 11 of the rolling body 5.

In the embodiment shown in FIG. 1 the central section 11a of the front face 11 does not make contact against the rim bearing surface 6a of the rim 6. Therefore the central region 11a of the front face 11, instead of extending in the form of a straight line, may also extend in substantially any other preferred manner, having, for example, a depression in the center.

The reference letter L refers to the axis of symmetry of the rolling body 5. As mentioned in the introduction, the edge region 11b of the front face 11 of the rolling body 5 is curved toroidally. In the embodiment shown in FIG. 1 the edge region 11b of the front face 11, in axial section, is curved substantially in the manner of a circle and has a radius of curvature $\rho_s$. Thus the edge region 11b in the embodiment shown in FIG. 1 is curved in a convex manner in the direction of the rim bearing surface 6a.

The rim 6 or the rim bearing surface 6a of the rim 6 is also curved toroidally, this curvature having a radius of curvature $\rho_f$. The reference number 19 refers to a circular line on which the edge region 11b of the front face 11 lies. The center of this circular line lies on the torus center line 14. The distance between the raceway 4 in the region of the front face 11 and the torus center line 14 corresponds approximately to the height h of the rim.

This torus center line 14 is situated at the distance a from the axis of symmetry L of the rolling body. The rolling body shown in FIG. 1 has the geometrical configuration shown in FIG. 1 in any preferred axially sectioned view. This means that the circular line 19 must also be turned about the axis of symmetry L in order to describe the front face 11 in its totality. In a transition zone or at a transition point 3 the edge region 11b curved in the manner of a circle and the central region 11a extending in the manner of a straight line merge with each other. Since the center of the circular curvature lies on the torus center line 14, a tangent to the circular line 19 would extend at the point 3 precisely on the central section 11a. Thus no edge is present on the front face 11.

The circle radii $\rho_f$ and $\rho_s$ are preferably in each case at least as great as three times the diameter Dw of the rolling body. The arrows indicating the radii $\rho_f$ and $\rho_s$ define at the same time the contact line 10 which extends through the contact point 8. This contact line 10 is inclined at an angle μ relative to the direction of the torus center line 14 and thus also the direction of the axis of symmetry L. By selecting this inclination the position of the contact point on the front face can be substantially freely chosen. Preferably, however, the contact point 8 lies at approximately half the height of the rim 6.

The reference number 4 distinguishes a central region of the bearing ring with the raceway 4a (not shown in greater detail) for the rolling body.

Figure 2:
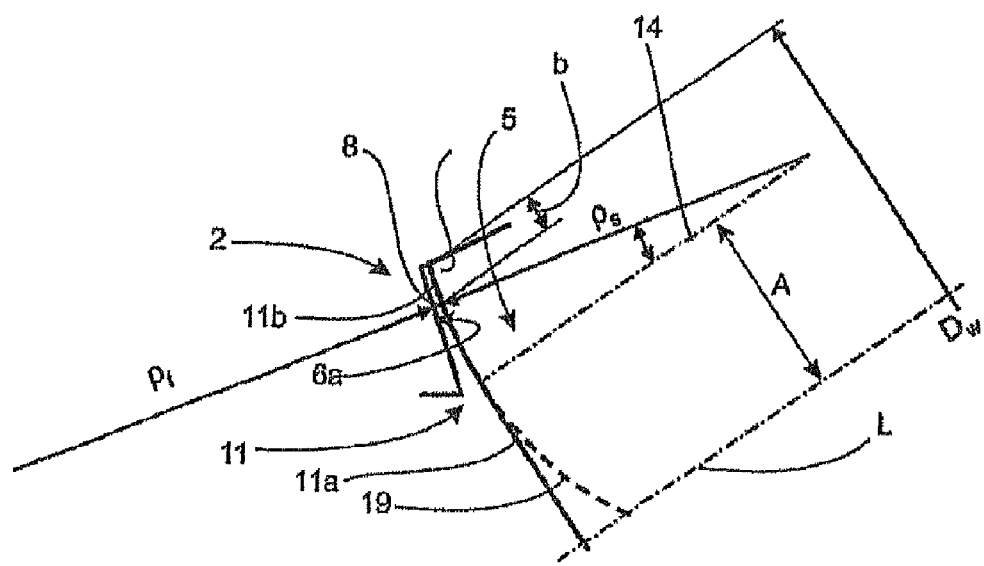
FIG. 2 is a further partial illustration of the rolling bearing according to the invention.

FIG. 2 shows an embodiment of a bearing according to the invention. In this case the radius of curvature of the rim bearing surface 6a was chosen so as to be infinite, i.e. in the illustration shown in FIG. 2 the rim bearing surface extends substantially as a straight line. If this rim bearing surface 6a is turned about a central axis (not shown) of the bearing, this produces a cone since, in the embodiment shown in FIG. 2, the rim bearing surface 6a is inclined at more than 90° with respect to the central region 4 of the bearing ring. The angle, at which the lateral surface of this cone is inclined with respect to the base of this cone, is determined in this respect by the rim aperture angle α minus 90°. It is also possible, however, to fix the rim aperture angle at 90°, in which case the cone is geometrically transformed into a plane. The reference letter b refers to the radial distance between the end point of the front face 11 and the contact point 8.

As mentioned in the introduction, the edge region 11b or the front face 11 could also conversely be designed as a straight line and, instead of this, the rim bearing surface 6a curved in a convex manner in the direction of the front face 11. It would also be possible for either the edge region 11a or the rim bearing surface 6a to be curved in a concave manner, i.e. inwards, in which case this concave curvature would then have to be compensated for by a corresponding greater convex curvature, i.e. a smaller radius of curvature of the respective other surface.

By means of a suitable choice of the geometry of the front surface 11 and the rim bearing surface 6a the approximately Hertzian contact area can be selected in such a way that its main axis lies in the circumferential direction of the rolling body. In this way particularly favorable use of the section of material between the front face 11 and the rim bearing surface 6a is achieved.

In FIGS. 1 and 2 the embodiment of a tapered roller bearing is shown, although the present invention may be correspondingly applied also to other types of bearing, such as cylindrical roller bearings or self-aligning ball bearings. In the case of cylindrical roller bearings the central region 4 of the bearing ring would extend substantially parallel to the axis of symmetry L of the rolling body.

All the features disclosed in the application documents are claimed as essential for the invention in so far as they are novel individually or in combination with respect to the state of the art.

LIST OF REFERENCE NUMBERS/LETTERS

1 Rolling bearing
2 Bearing ring
3 Transition zone
4 Central region of bearing ring 2
4a Raceway
5 Roiling body
6 Lateral rim
6a Rim bearing surface
8 Contact point
10 Contact line
11 Front face
11a Central section of front face 11
11b Edge region of front face 11
14 Torus center line
19 Circular line
L Axis of symmetry of rolling body
$\rho_s, \rho_f$ Radius of curvature
a Distance between axis of symmetry of rolling body 5 and torus center line 14
h Rim height
b Radial distance between contact point 8 and end of front face
Dw Diameter of rolling body
$\mu$ Angle between axis of symmetry and contact line 10
$\alpha$ Rim aperture angle

What is claimed is:

1. A rolling bearing comprising:
   at least one bearing ring; and
   a plurality of rolling bodies, the bearing ring having a raceway for the rolling bodies and at least one lateral rim for axially guiding the rolling bodies,
   wherein the rolling bodies have a front face facing the rim and the rim has a rim bearing surface facing the rolling bodies have and the front face is, at least along sections, curved in a convex manner toroidally in a direction of the rim bearing surface, and
   wherein the front face has torodial curvature described by elliptical lines.

2. The rolling bearing as claimed in claim 1, wherein an aperture angle between the raceway and the rim bearing surface is greater than 90°.

3. The rolling bearing as claimed in claim 1, wherein both the front face and the rim bearing surface are curved at least along sections.

4. The rolling bearing as claimed in claim 1, wherein both the front face and the rim hearing surface are curved in a convex manner in the direction of the respective other surface or face.

5. The rolling bearing as claimed in claim 1, wherein the front face of the rolling bodies lie, at least along sections, on a circular line.

6. The rolling bearing as claimed in claim 5, wherein the circular line has a geometric center, which is offset with respect to an axis of symmetry of the rolling bodies in a direction of the curvature.

7. The rolling hearing as claimed in claim 1, wherein the rolling hearing is chosen from a group of rolling bearings which includes cylindrical roller bearings, tapered roller bearings, and self-aligning ball bearings.

8. The rolling hearing as claimed in claim 1, wherein a radius of curvature at least of the rim bearing surface or the front face is at least three times as great as a diameter of the rolling bodies.

9. The rolling bearing as claimed in claim 8, wherein a contact point in a radial direction of the rolling bodies is situated at least at the same distance from an axis of symmetry of the rolling bodies as a center of the circular line.

10. The rolling bearing as claimed in claim 1, wherein the curvatures of the rim bearing surface and the front face are formed such that substantially only one contact point occurs between the rim bearing surface and the front face.

* * * * *